United States Patent [19]
Chapman

[11] 3,750,595
[45] Aug. 7, 1973

[54] SHIPPING SYSTEM

[75] Inventor: Harvey W. Chapman, Detroit, Mich.

[73] Assignee: Evans Products Company, Plymouth, Mich.

[22] Filed: Oct. 7, 1970

[21] Appl. No.: 78,835

[52] U.S. Cl............................. 105/376, 105/369 BA
[51] Int. Cl.......................... B60p 7/14, B61d 45/00
[58] Field of Search................. 105/369 B, 369 BA, 105/369 S, 369 D, 376, 374; 214/10.5 D

[56] References Cited
UNITED STATES PATENTS

| 3,177,816 | 4/1965 | Daberkow | 105/369 BA |
| 3,427,995 | 2/1969 | Stafford, Jr. | 105/369 BA |
| 2,885,221 | 5/1959 | Weeks | 105/369 D |
| 3,427,997 | 2/1969 | Brown, Jr. et al. | 105/369 BA |
| 3,467,028 | 9/1969 | James | 105/376 |
| 3,017,843 | 1/1962 | Loomis et al. | 105/376 |
| 3,336,880 | 8/1967 | Johnston | 105/376 |
| 3,192,879 | 7/1965 | Pier | 105/369 BA |
| 3,554,135 | 1/1971 | Duvall | 105/369 BA |
| 1,206,648 | 11/1916 | Bacon | 105/369 S |

Primary Examiner—Drayton E. Hoffman
Attorney—Harness, Dickey & Pierce

[57] ABSTRACT

A freight bracing system particularly adapted for the transportation of freight in railway cars. The system includes a pair of pneumatically urged bulkheads, each supported adjacent one end wall of the railway car. In addition, a movable bulkhead assembly comprised of two panels adapted to be urged apart pneumatically is supported for movement along the length of the car. In this way, load units positioned between the respective pneumatic devices are braced and are pneumatically cushioned at each end.

7 Claims, 7 Drawing Figures

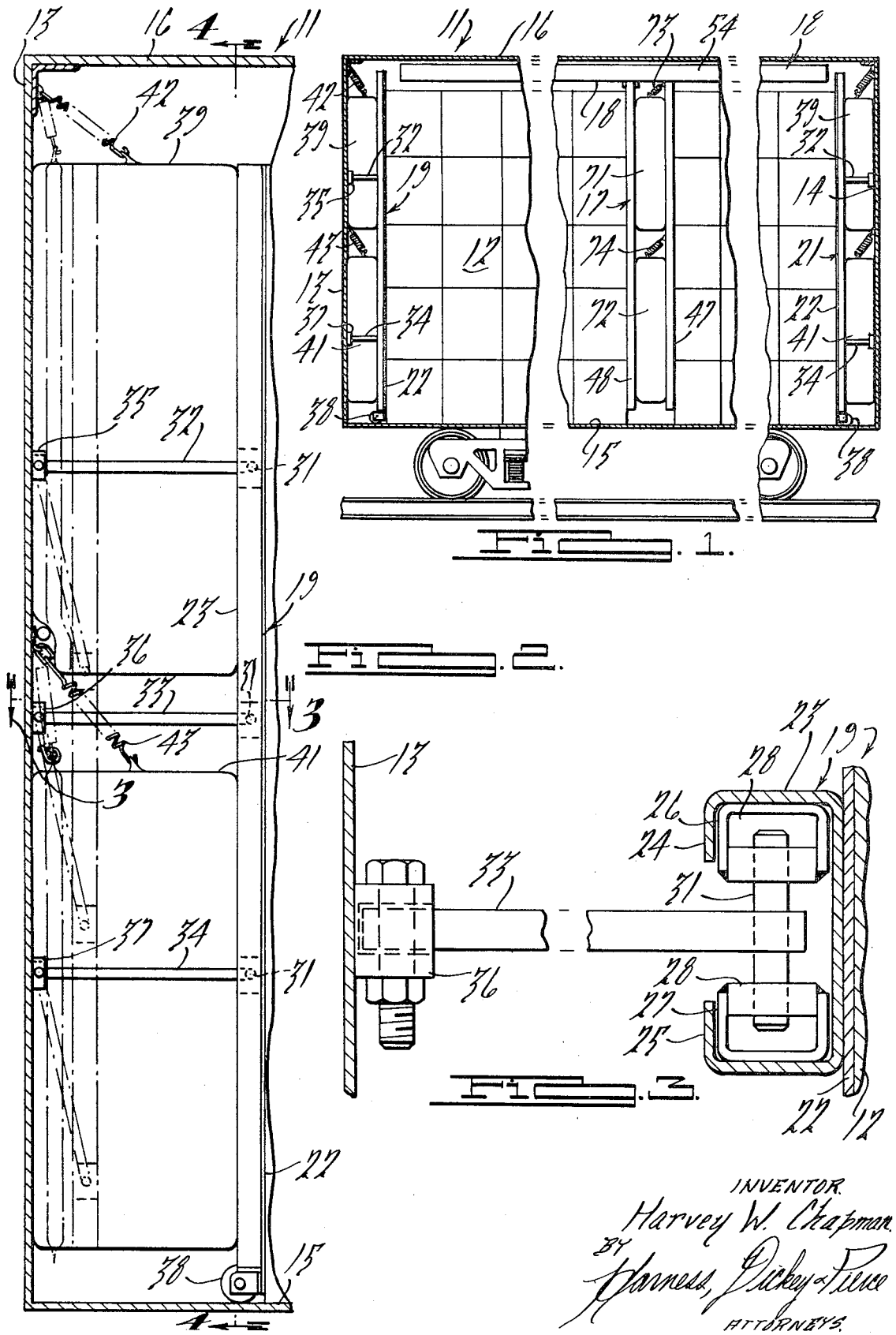

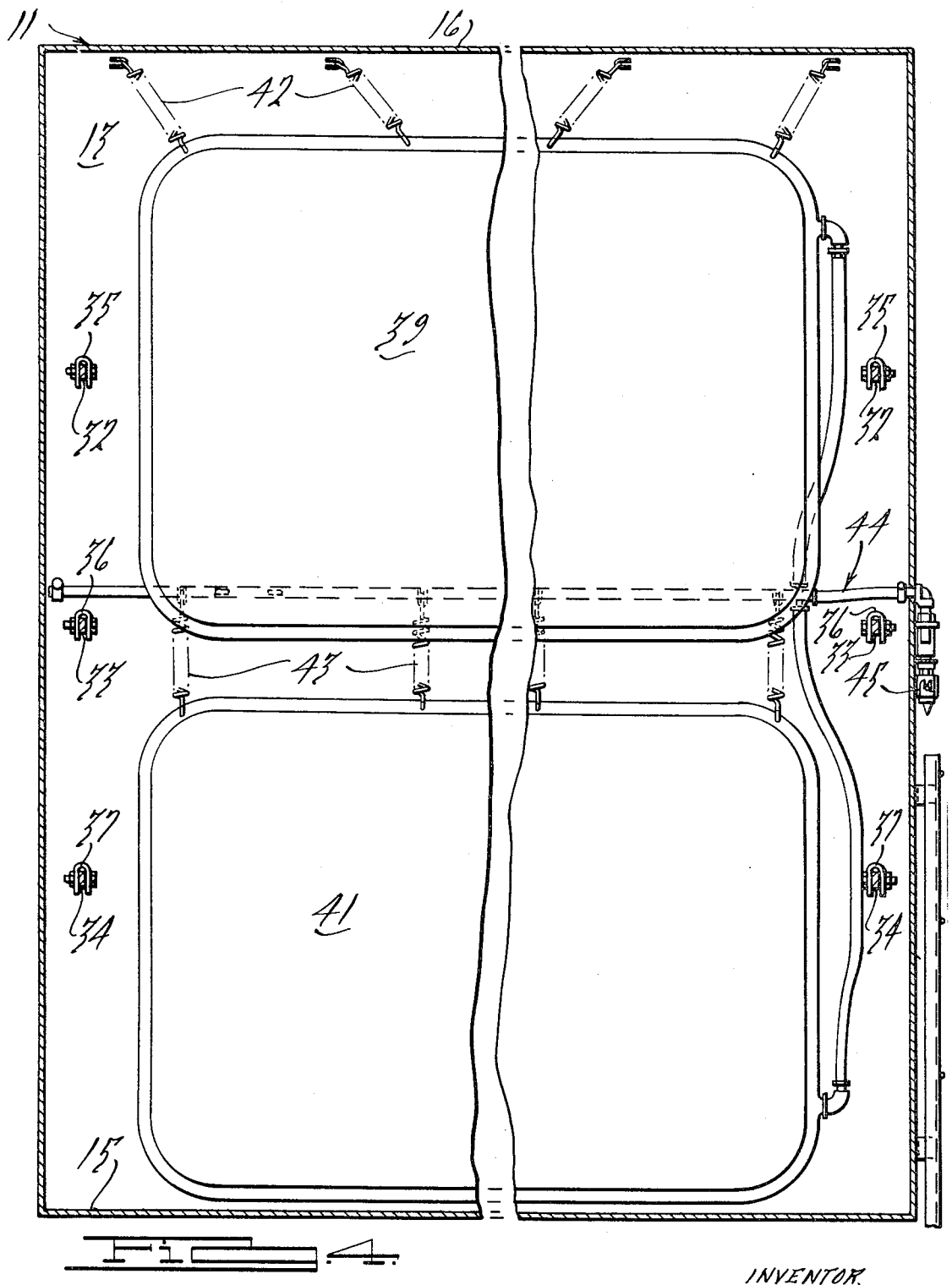

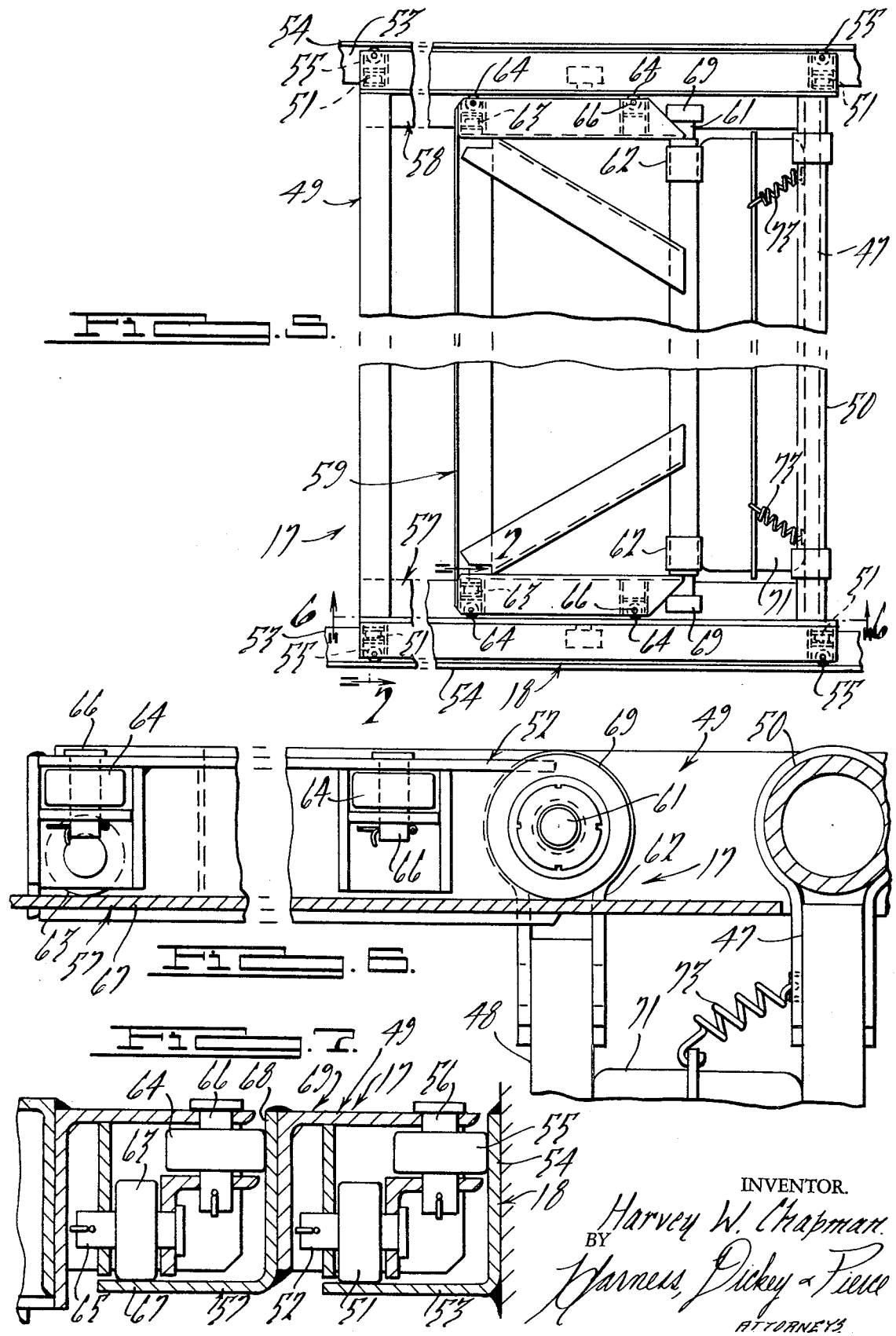

SHIPPING SYSTEM

BACKGROUND OF THE INVENTION

This invention relates to a shipping or freight bracing system and particularly to an improved arrangement for cushioning freight during shipment.

The use of pneumatic bulkhead assemblies for bracing freight during shipment has gained wide acceptance. In addition to providing the conventional bracing function, such bulkhead assemblies have been found to provide a significant degree of cushioning and attendant reduction in freight damage. One of the more widely used systems incorporating pneumatic bulkhead assemblies employs one or two such bulkhead assemblies that are longitudinally movable of the car. One end of the freight load is engaged by one side of the bulkhead assembly and the other end of the freight load engages one end wall of the freight transporting vehicle. Such an arrangement provides resilient cushioning of the braced load unit in only one direction. The impact loads exerted against the freight are experienced normally in both directions, however.

It is, therefore, one object of this invention to provide a freight bracing system in which freight is braced against impact loads in both directions.

It is another object of the invention to provide a freight bracing system wherein the freight is resiliently cushioned against impact loads in both directions.

Although the freight load may be braced in both directions by employing bulkheads that are supported upon the end walls of the transporting vehicle, the central door placement of conventional transporting vehicles such as rail cars makes unloading difficult. During transit the load will shift and the individual load units will become wedged together. Retraction of the remotely positioned, end wall supported bulkhead assemblies will not remove sufficient pressure from the load adjacent the doorway so as to permit rapid unloading. This problem can be obviated through the use of a centrally positioned movable bulkhead assembly.

It is, therefore, a further object of the invention to provide an improved freight bracing system embodying a plurality of pneumatic bulkheads.

In one form of bulkhead assembly, a pair of freight bracing members are supported for movement along the cargo area and each is adapted to brace freight across one of its faces. Some arrangement is provided for varying the spacing between the respective freight bracing members, such as a pneumatic cushioning device. Since the respective freight bracing members move relative to each other, each must be supported for longitudinal movement. It is important, however, to limit the degree of movement of the freight bracing members relative to each other.

Bulkhead assemblies are normally supported for movement along the length of the cargo area by means that include overhead tracks. It is difficult to insure completely accurate spacing between these tracks. As a result, it is desirable to provide a relatively long carriage assembly for supporting the bulkhead from the tracks. If two adjacent bulkheads are employed, the provision of such long carriages makes it impossible to store the bulkheads adjacent one of the cargo areas.

It is, therefore, another object of this invention to provide a bulkhead assembly having an improved trolley structure for supporting two relatively movable bracing members of such an assembly.

It is another object of the invention to provide a bulkhead assembly wherein two relatively movable freight engaging members may be stored closely aadjacent each other and closely adjacent at least one cargo area end wall.

SUMMARY OF THE INVENTION

This invention is adapted to be embodied in a freight bracing system for a freight transporting vehicle that is comprised of spaced walls defining at least in part a cargo area. The system includes first and second bulkheads each supported for movement relative to a respective end wall from a position adjacent the respective end wall to a bracing position spaced therefrom. A movable bulkhead assembly is supported for movement along at least a portion of the length of the cargo area to positions spaced between the bracing positions of the first and second bulkheads. The movable bulkhead assembly is comprised of a pair of freight bracing members and means for altering the distance between the bracing members for bringing them into engagement with one side of a freight load unit.

Another feature of this invention is adapted to be embodied in a freight bracing bulkhead assembly. Such a bulkhead assembly is comprised of a first freight bracing member and an associated carriage structure. The carriage structure is operatively connected to the first bracing member and is adapted to support the first bracing member for movement along a cargo area through cooperation with cargo area support tracks. A second bracing member is affixed to a second carriage structure. The second carriage structure is movably supported by the first carriage structure for movement of the second bracing member relative to the first bracing member and for movement of both bracing members along the cargo area through movement of the first carriage.

BRIEF DESCRIPTION OF THE DRAWINGS

FIG. 1 is a longitudinal cross sectional view of a railroad car embodying this invention.

FIG. 2 is an enlarged view, taken in the same plane as FIG. 1, showing one of the car end walls and the associated bulkhead assembly.

FIG. 3 is a further enlarged cross sectional view taken along the line 3—3 of FIG. 2.

FIG. 4 is a cross sectional view taken along the line 4—4 of FIG. 2.

FIG. 5 is a top plan view, on an enlarged scale, showing the carriage structure for the movable bulkhead assembly of the car in FIG. 1.

FIG. 6 is an enlarged cross sectional view taken along the line 6—6 of FIG. 5.

FIG. 7 is an enlarged cross sectional view taken along the line 7—7 of FIG. 5.

DETAILED DESCRIPTION OF THE PREFERRED EMBODIMENT

Referring first to FIG. 1, a freight carrying vehicle embodying this invention is identified generally by the reference numeral 11. The vehicle 11 is a railroad box car having a freight carrying area 12 that is defined at least in part by end walls 13 and 14, a floor 15 and a roof 16. The cargo area 12 is divided into two separate cargo receiving spaces by means of a movable bulkhead assembly, indicated generally by the reference numeral 17. The movable bulkhead assembly 17 is supported for movement along at least a portion of the car 11 by means of overhead tracks 18, in a manner which will become more apparent as this description proceeds. Generally, the movable bulkhead assembly 17 will be positioned adjacent the side doors of the car (not shown) when the car is fully loaded. In this condition, freight will be positioned on either side of the movable bulkhead assembly 17. End supported bulkhead assemblies 19 and 21 are juxtaposed to the end walls 13 and 14 for coaction with the movable bulkhead assembly 17 to resiliently cushion and brace the freight.

Referring now primarily to FIGS. 2 through 4, each of the end supported bulkhead assemblies 19 and 21 is substantially the same in construction and, therefore, only the construction of the bulkhead assembly 19 will be described in detail. The bulkhead assembly 19 is comprised of a facing panel 22 that is adapted to engage one end face of the carried freight. Affixed to the opposite side of the panel 22 are a pair of vertically extending channel members 23. The channel members 23 each have inturned leg portions 24 and 25 that trap a respective pair of vertically extending channels 26 and 27. Pairs of vertically spaced blocks 28 are affixed to the channels 26 and 27 and journal horizontally extending pivot pins 31. Each of the pivot pins 31 is connected to one of respective pairs of links 32, 33 and 34. The opposite ends of each of the pairs of links are pivotally supported upon the car end wall 13 by means of brackets 35, 36 and 37.

It should be readily apparent that pivotal movement of the pairs of links 32, 33 and 34 causes the panel 22 to move toward and away from the end wall 13. The links 32, 33 and 34 act like a parallelogram system and hold the panel 22 in a parallel relationship to the end wall 13. The panel 22 is supported vertically with respect to the floor 15 by means of roller assemblies 38 that are fixed to the lower ends of the channel members 23. Alternatively the panel 22 may be supported vertically by means of overhead tracks and trolley system (not shown) as employed in conventional bulkhead assemblies. Also in some instances the parallelogram linkage system may not be required or desired.

In order to control the positioning of the panel 22 with respect to the end wall 13 and to provide a resilient cushioning for one end of the freight that is contained between the movable bulkhead assembly 17 and each of the end wall supported bulkhead assemblies 19 and 21, air bags 39 and 41 are interposed between the panels 22 and the respective of the end walls 13 and 14. The air bags 39 and 41 are suspended from the respective end wall by means of suspension spring assemblies 42 and 43, respectively. A manifolding system, indicated generally by the reference numeral 44, has connections to the interior of the air bags 39 and 41 for charging these bags. The manifold system 44 has an inlet fitting 45 that is positioned on the exterior of the car 11 to permit filling and emptying of the air bags 39 and 41.

Referring now to FIGS. 5 through 7, the movable bulkhead assembly 17 is comprised of first and second panels 47 and 48 that are movable longitudinally of the car 11 upon the tracks 18 and which are movable longitudinally relative to each other in a manner which will become more apparent as this description proceeds. The panel 47 depends from a first carriage assembly, indicated generally by the reference numeral 49.

Preferably, the panel 47 is supported for pivotal movement relative to the first carriage assembly 49 by means including a shaft 50 carried by the carriage assembly 49. The carriage assembly 49 is formed as a frame having a generally open configuration. Adjacent its four corners the frame carries roller assemblies each of which is comprised of a first roller 51 that is supported for rotation about a horizontally disposed axis on a shaft 52. The roller 51 is adapted to engage a horizontally extending leg 53 of the track 18, which track is formed from a structural angle. The other track leg 54 is affixed to the car in any known manner, as by welding. A second roller 55 is supported for rotation about a vertically extending axis by means of a shaft 56 and engages the track leg 54. Since the pairs of rollers 51 and 55 are positioned at the four corners of the frame 49, they will permit rolling movement of thee frame 49 and panel 47 along the length of the car. The rollers 51 support the vertical weight of the assemblies and the rollers 55 prevent cocking of the frame 49 when a force is applied to the panel 47 and permit free rolling along the car 11.

Structural angles 57 and 58 are affixed to the side rails of the carriage frame 49. These angles 57 and 58 serve to support a second carriage, indicated generally by the reference numeral 59. Like the carriage 49, the carriage 59 is a frame having a generally open shape. A shaft 61 is journaled at one end of the carriage frame 59. The panel 48 is pivotally supported upon the shaft 61 by means of two or more hanger brackets 62.

The carriage 59 and panel 48 are supported for movement along the carriage 49 by a suspension arrangement similar to that used to support the carriage 49 for movement along the rails 18. This supporting arrangement is comprised of pairs of rollers 63 and 64 positioned at the outermost corners of the carriage frame 59. The rollers 63 are supported for rotation about a horizontal axis by means of shafts 65 and the rollers 64 are supported for rotation about vertical axes by shafts 66. The rollers 63 engage horizontally extending legs 67 of the angles 57 and 58 and the rollers 66 engage vertically extending legs 68 of these angles.

A pair of rollers 64 are also supported for rotation about vertically disposed axes by means of shafts 66 at the opposite sides of the innermost end of the carriage frame 59. Horizontally disposed rollers 69 are journaled on the opposite ends of the shaft 61. The rollers 64 coact with the track leg 68 and the rollers 69 coact with the track leg 67. Thus, it should be clear that the carriage 59 may move freely along the carriage 49 so as to permit movement of the panels 47 and 48 relative to each other.

A pair of air bags 71 and 72 is suspended between the panels 47 and 48 by means of suspension springs 73 and 74. The upper ends of the springs 73 and 74 are connected to the panel 47. It should be readily apparent that inflation of the bags 71 and 72 through a manifold system (not shown) will urge the panels 47 and 48 away from each other and will resiliently cushion the movement of the panels toward each other.

LOADING OPERATION

To load the car 11, freight is positioned in each of the cargo spaces extending between the movable bulkhead assembly 17 and the respective end wall supported bulkhead assemblies 19 and 21. The cargo should be loaded so that the panels 22 of the end wall supported bulkhead assemblies is not flush against the respective end wall. This may be accomplished by partially inflating the air bags 39 and 41. During this loading procedure, the air bags 71 and 72 of the movable bulkhead assembly 17 are completely deflated. Once the facing ends of the respective loads are juxtaposed to the panels 47 and 48 of the movable bulkhead assembly 17, the bags 71 and 72 may be inflated to the desired pressure. At this time, the pressure in the air bags 39 and 41 of the end wall supported bulkhead assemblies 19 and 21 is also increased to the desired pressure. This pressurization of the respective air bags causes the panels 22, 47 and 48 to move into firm bracing relationship with the respective faces of the load. It should be noted that when the air bags 71 and 72 of the movable bulkhead assembly 17 are inflated, the panels 47 and 48 will move away from each other by movement of either or both of the carriages 49 and 59. When one panel of the movable assembly 17 engages the respective face of the load, the other panel will then move into engagement with its respective load face.

During shipment each load unit is engaged at its opposite faces by a resiliently cushioned panel. Thus, upon the application of an impact load to either end of the car 11, the load will be held in place and some resilient cushioning will result. Thus, complete control against damage is insured. Upon reaching of the destination, the air bags 71 and 72 of the movable bulkhead assembly 17 are deflated and the load may be removed.

It should be noted that the support of the carriage 59 upon the carriage 49 has several advantages. Since it is difficult to maintain accurate spacing between the tracks 18, it is desirable to provide a relatively long supporting carriage for the movable bulkhead assembly. Such long carriages with rollers at opposite ends makes movement easier and is more stable against racking. Since the carriage 49 can be assembled upon the fixture, the spacing between its tracks 57 and 58 can be accurately controlled. Thus, the carriage 59 may be made considerably shorter than if it were suspended itself from the car mounted track 18. The carriage on carriage arrangement also permits the panels 47 and 48 to be stored closely adjacent each other and closely adjacent the car end wall 14 when desired.

While it will be apparent that the preferred embodiment of the invention disclosed is well calculated to fulfill the objects above stated, it will be appreciated that the invention is susceptible to modification, variation and change.

What is claimed is:

1. A freight bracing system for a freight transporting vehicle comprised of spaced end walls and side walls defining at least in part a cargo area and a doorway opening in at least one of the side walls, a first bulkhead supported for movement relative to one of said walls from a position adjacent said one wall to a bracing position spaced contiguous to said one wall and at a substantial distance from the one wall, a second bulkhead supported for movement relative to the other of said walls from a position adjacent said other wall to a bracing position spaced contiguous to said other wall and at a substantial distance therefrom, said first and said second bulkheads being spaced a considerable distance from each other when in their bracing positions and defining a cargo containing space therebetween, and a movable bulkhead assembly supported for movement along at least a portion of the length of said cargo area to positions spaced between the bracing positions of said first bulkhead and said second bulkhead and within the cargo containing space defined therebetween, said movable bulkhead assembly comprising a pair of freight bracing members, a first of said freight bracing members being supported for movement along the cargo area by a carriage, the second of said freight bracing members being supported by a carriage, which carriage is directly movably supported on support and guide means on the carriage of said first freight bracing member and means for altering the distance between said freight bracing members for bringing them into engagement with one side of a freight load unit.

2. A freight bracing system as set forth in claim 1 further including pneumatically inflated bags interposed between the freight bracing members of the movable bulkhead assembly.

3. A movable bulkhead assembly for bracing freight or the like comprising a first carriage structure adapted to be supported for movement longitudinally of a cargo area, a first freight bracing panel suspended from said first carriage, a second carriage supported directly upon a support and guide means on said first carriage for longitudinal movement relative thereto, and a second bracing panel suspended from said second carriage and means for altering the distance between said first and second freight bracing panels.

4. A movable bulkhead assembly as set forth in claim 3 wherein the means for altering the distance between the panels comprises a pneumatically inflated bag interposed between said panels.

5. A movable bulkhead assembly as set forth in claim 3 wherein at least one of the panels is pivotally supported upon its carriage.

6. A movable bulkhead assembly as set forth in claim 3 wherein the means for supporting each of the carriages for longitudinal movement comprises roller means at corners of the respective carriage.

7. A movable bulkhead assembly as set forth in claim 6 wherein each of the roller means comprises a pair of rollers supported for rotation about axes disposed at substantial angles to each other.

* * * * *